United States Patent
Wilson et al.

(10) Patent No.: US 10,196,491 B2
(45) Date of Patent: Feb. 5, 2019

(54) MICROENCAPSULATED AMINOSILOXANES FOR PROTECTIVE MATERIAL FORMULATIONS

(71) Applicant: Autonomic Materials, Inc., Champaign, IL (US)

(72) Inventors: Gerald O. Wilson, Champaign, IL (US); Subramanyam V. Kasisomayajula, Champaign, IL (US); Mei-Hsiu Lai, Urbana, IL (US); Christopher R. Dayton, Champaign, IL (US); Angela C. Smith, St. Joseph, IL (US)

(73) Assignee: Autonomic Materials, Inc., Champaign, IL (US)

( * ) Notice: Subject to any disclaimer, the term of this patent is extended or adjusted under 35 U.S.C. 154(b) by 14 days.

(21) Appl. No.: 15/376,476

(22) Filed: Dec. 12, 2016

(65) Prior Publication Data

US 2017/0166709 A1     Jun. 15, 2017

Related U.S. Application Data

(60) Provisional application No. 62/266,499, filed on Dec. 11, 2015.

(51) Int. Cl.
| | | |
|---|---|---|
| C08J 3/24 | (2006.01) | |
| C09D 5/03 | (2006.01) | |
| C09D 5/08 | (2006.01) | |
| C09D 7/63 | (2018.01) | |
| C09D 7/65 | (2018.01) | |
| C08G 59/18 | (2006.01) | |
| C08G 59/24 | (2006.01) | |
| C08G 59/50 | (2006.01) | |
| C08L 83/08 | (2006.01) | |
| C09D 163/00 | (2006.01) | |
| C09J 163/00 | (2006.01) | |

(52) U.S. Cl.
CPC ............ *C08J 3/241* (2013.01); *C08G 59/188* (2013.01); *C08G 59/245* (2013.01); *C08G 59/504* (2013.01); *C09D 5/038* (2013.01); *C09D 5/08* (2013.01); *C09D 7/63* (2018.01); *C09D 7/65* (2018.01); *C09D 163/00* (2013.01); *C09J 163/00* (2013.01); *C08G 2150/20* (2013.01); *C08G 2150/90* (2013.01); *C08J 2363/00* (2013.01); *C08L 83/08* (2013.01)

(58) Field of Classification Search
CPC .................................................... C08G 59/188
See application file for complete search history.

(56) References Cited

U.S. PATENT DOCUMENTS 4,536,524 A * 8/1985 Hart ...................... C08G 59/18
                                                 156/330
8,431,653 B2 * 4/2013 Ogawa ................ C08G 59/184
                                                 525/476

* cited by examiner

*Primary Examiner* — Peter F Godenschwager
(74) *Attorney, Agent, or Firm* — Schwabe, Williamson & Wyatt, P.C.

(57) ABSTRACT

Disclosed herein are methods and formulations for the microencapsulation of aminosiloxanes, for example for use as an additive in protective material formulations such as those used in the protection and/or joining of metal substrates. The additives may be used in conjunction with a second reactant that may or may not be similarly microencapsulated for self-healing (and associated corrosion resistance) or delayed cure applications, or they may be used alone or in conjunction with other corrosion inhibitors for protective formulations with improved corrosion resistance on appropriate substrates.

22 Claims, 8 Drawing Sheets

*Aminosiloxane 2*

*Aminosiloxane 3*

*Aminosiloxane 1*

Average Size Range: 20-30μm

Average Size Range: 80-100μm

Average Size Range: 10-15μm

Average Size Range: 40-50μm

MICROENCAPSULATED AMINOSILOXANES FOR PROTECTIVE MATERIAL FORMULATIONS

CROSS REFERENCE TO RELATED APPLICATIONS

The present application claims priority to U.S. Provisional Patent Application No. 62/266,499, filed Dec. 11, 2015, entitled "MICROENCAPSULATED AMINOSILOXANES FOR PROTECTIVE MATERIAL FORMULATIONS," the disclosure of which is hereby incorporated by reference in its entirety.

TECHNICAL FIELD

Embodiments relate to microencapsulated aminosiloxanes, and more particularly, microencapsulated aminosiloxanes for use in smart material formulations for the protection and/or joining of metal substrates.

BACKGROUND

Some self-healing epoxy materials contain microcapsules with healing agent formulations that, upon damage, are released and may react to heal the damage site in an epoxy material. However, most reagents capable of curing epoxy resins at ambient conditions are amines and amides with amphiphilic properties. Thus, common encapsulation approaches based on the formation of stable oil-in-water emulsions cannot be employed, as the amine or amide functionality remains at the interface between the oil and water phases, thereby disrupting the encapsulation process.

For these reasons, self-healing chemistries designed and tested for epoxies have largely been based on alternative chemistries such as ring opening metathesis polymerization (ROMP), silanol condensation, and hydrosilylation. The difficulty of encapsulating amines also has led to the development of other approaches to employ amine-functionalized curing agents without compartmentalization via typical microencapsulation processes, such as the use of latent reactivity in an epoxy matrix. Other approaches include the production of hollow capsules or the use of other porous carriers, such as glass particles, followed by infiltration of an amine curing agent into these capsules or porous carriers. These approaches have shown limited success.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

DETAILED DESCRIPTION OF DISCLOSED EMBODIMENTS

Figure 1:
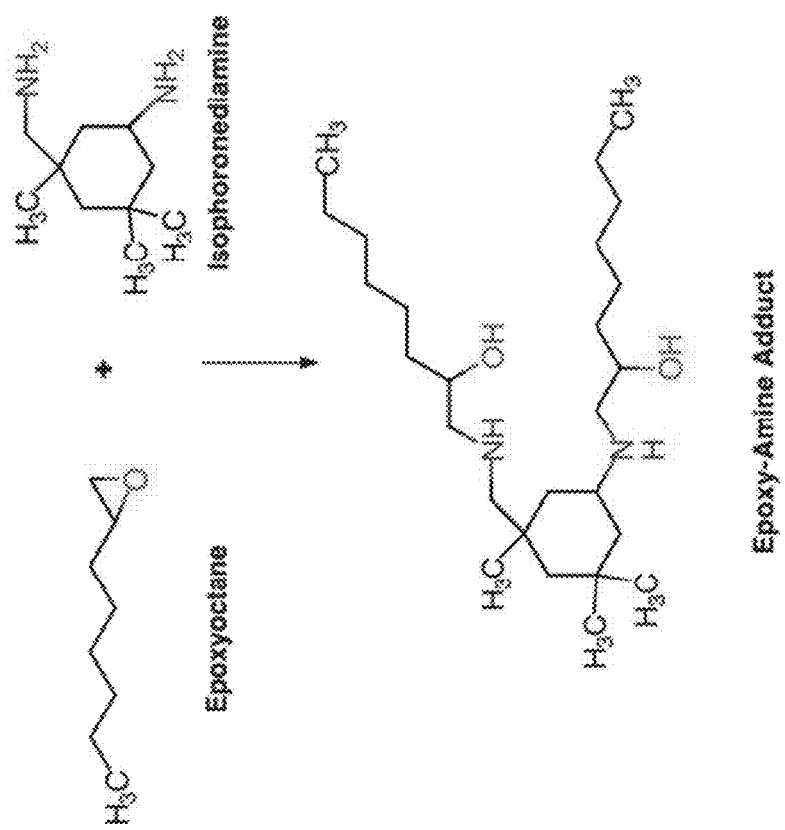
FIG. 1 illustrates a prior art epoxy-amine adduct formation.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

Embodiments herein provide microencapsulated aminosiloxanes for use in protective material formulations for the protection of and/or joining of metal substrates. In some embodiments, the encapsulated aminosiloxanes may be used in self-healing and/or protective materials, such as a dual capsule epoxy system. In various embodiments, the protective materials may be epoxies, and in other embodiments, because microcapsule-based self-healing chemistries are compartmentalized within the capsules, they may be used in other (non-epoxy) matrices, so long as they are chemically and mechanically compatible.

In various embodiments, the disclosed protective materials may provide sufficient metal substrate protection to protect metal substrates from corrosion. Protective adhesives and sealants, in addition to their primary use in joining or sealing specific substrates of interest, also may mitigate corrosion if the substrates they join are metal substrates that could corrode. As such, these adhesives and sealants, like protective coatings, may benefit from the epoxy-based self-healing chemistries disclosed herein. In addition, since these materials may be used in interior and exterior applications, they may also provide resistance to UV radiation.

In various embodiments, the disclosed protective material formulations may include a first plurality of microcapsules encapsulating an aminosiloxane, wherein the aminosiloxane comprises a primary amine functional group that is capable of reacting with an uncured epoxy resin to form a cross-linked epoxy resin at ambient temperature. In some embodiments, the first plurality of microcapsules may further encapsulate a hydrophobic solvent and/or a liquid hydrophobic corrosion inhibitor. In some embodiments, the protective material also may include a second plurality of microcapsules encapsulating an epoxy resin capable of being cross-linked at ambient conditions by a primary amine, and the protective material formulation may be a component in a coating material, sealant or adhesive formulation, which may be applied to a metal substrate, in certain examples.

Also disclosed herein are corrosion inhibiting or resistant coatings, sealants, and adhesive formulations that include the protective material formulations described above. In some embodiments, the corrosion inhibiting or resistant coating, sealant, or adhesive may be applied to a metal substrate. Also contemplated are self-curing resin systems that include the protective material formulations described above. In some embodiments, the microcapsules may be dispersed within an uncured epoxy resin, liquid or powder coating, adhesive or sealant formulation, and in particular embodiments, the self-curing resin system may be a "one-part" formulation, wherein a curing event is initiated upon rupture of one or more of the first plurality of microcapsules, such as via heat or application of mechanical force.

Prior art epoxy-based materials for solvent-promoted healing often have relied on latent reactivity present in the matrix of the epoxy-based material, which requires the availability of residual curing agent in the cured material. The efficacy of this approach may vary depending on epoxy formulation type, since the degree of cross-linking of the epoxy resin at the site of damage during a healing event varies based on the availability and reactivity of residual curing agent present in the coating film.

In another prior art approach, vacuum infiltration of hollow capsules with primary amines is inherently unstable and presents the possibility of leakage out of the capsules. Passive wetting of other porous particles, such as glass particles, does not allow for event-initiated release, but rather is characterized by ongoing passive release. Such passive release may facilitate premature cross-linking of the matrix formulation prior to application and curing.

Triethylenetetramine (TETA) microencapsulation via a procedure employing a microfluidic device using capsules made from a photopolymerizable resin (or typical epoxy curing agents such as polyamines) results in polymerized epoxies that are susceptible to UV radiation. FIG. 1 illustrates a prior art epoxy-amine adduct formation. As shown in FIG. 1, another prior art approach to microencapsulating amphiphilic amines includes first forming an adduct with decreased water solubility, followed by encapsulation via a free radical-initiated polymerization of methyl methacrylate (MMA) and butyl methacrylate (BMA). The resulting encapsulated adduct is a secondary amine with significantly lower reactivity at room temperature relative to primary amines.

By contrast, disclosed herein in various embodiments are systems comprising microencapsulated aminosiloxanes with primary amine functionality, which may be used in single-microcapsule and dual-microcapsule formulations. In some embodiments, these formulations may be used in one-part or "1K" epoxy systems (e.g., a formulation with the resin and curing agent (in the encapsulated form) blended together prior to application of the coating), two-part or "2K" formulations (e.g. a resin component and a curing agent component that are mixed together at the time of application of the coating), or as corrosion inhibiting microcapsules that may be used purely as smart corrosion inhibitors during the formulation of coatings, sealants and adhesives for specific substrates such as aluminum. In some embodiments, the dual capsule formulations may include aminosiloxane microcapsules that may be combined with microcapsule-containing formulations that include an epoxy resin; upon rupture, the ingredients of these capsules may mix and react to form a cross-linked epoxy material.

In various embodiments, the corrosion inhibitors of use in the disclosed protective material systems may have the ability to combine in a homogeneous blend with the disclosed aminosiloxanes. For instance, such corrosion inhibitors may be completely miscible with a broad range of liquid aminosiloxane-based healing agent formulations. In addition, such corrosion inhibitors, upon in combination with the disclosed aminosiloxanes, may also exhibit characteristics that render them suitable for encapsulation and dispersion into a coating, reinforced polymer composite, adhesive, sealant, or other matrix in the encapsulated form.

Thus, in various embodiments, a corrosion inhibitor for use in the disclosed protective material systems generally must be a liquid for facile incorporation into liquid encapsulated healing agent formulations and to ensure release as part of the formulation. The corrosion inhibitor also generally must be insoluble in water, for instance for compatibility with a microencapsulation process dependent on the formation of an oil-in-water emulsion.

In various embodiments, a corrosion inhibitor for use in the disclosed protective material systems also generally must be miscible with a broad range of protective material formulations to form a single hydrophobic phase that can be encapsulated. Such corrosion inhibitors also generally must have a pH of between 4 and 8, for example, to prevent additional challenges to the microencapsulation reaction mixture's ability to maintain the pH range critical for successful shell wall formation, in accordance with various embodiments. Additionally, as part of the encapsulated healing agent formulation, in various embodiments, the corrosion inhibitor may promote adhesion to metal substrates including iron, aluminum and steel substrates.

A category of liquid corrosion inhibitors that meet these characteristics and that may be used in a range of protective material formulations is the hybrid (organic-inorganic) sol-gel alkoxysilane-based liquid corrosion inhibitors. In various embodiments, these inhibitors may form an adhesion-promoting and corrosion-inhibiting sol-gel film on the surface of the substrate. Coupling to the metal surface begins with hydrolysis of the alkoxysilane to form a silanol, which couples with hydroxyl-rich surfaces of the metal substrate via condensation reactions, in accordance with various embodiments. In some embodiments, further moisture-promoted condensation of adjacent alkoxysilane groups may lead to the formation of a dense three-dimensional film across the metal substrate.

In various embodiments, the formation of this network may impart improved corrosion resistance to the substrate by impeding the transportation of ions through the network. Thus, when released as part of a protective material formulation, the corrosion inhibitor may form a layer closest to the substrate that is well adhered to the surface, as well as the rest of the protective material. In various embodiments, the hydrophobicity afforded by the silicone functionality may facilitate repulsion of moisture and protection from corrosion upon release into the site of damage during a healing event.

A representative structure of the alkoxysilanes used in the preparation of these inhibitors is shown in scheme 1, below:

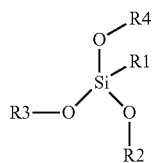

Groups labeled "R1," "R2," "R3," and "R4," may each independently be methyl, ethyl, or a higher molecular weight aliphatic group, such as propyl and butyl groups. However, in various embodiments, the effectiveness of the inhibitor may depend on the rate of the hydrolysis reaction, which may be impacted by steric bulk around the silicon atom, as well as the evaporation rate of the alcohol byproduct. As such, alkoxysilanes where "R" is a methyl or ethyl group may yield particularly effective inhibitors. In various embodiments, the corrosion inhibitor molecule may be tethered to an oligomer or polymer chain or to a solid support prior to encapsulation. In other embodiments, the corrosion inhibitor may be tethered to the microcapsule shell wall via R1, R2, R3, or R4.

A second category of corrosion inhibitors that meet these characteristics and that may be used in a wide range of protective material formulations are hydrophobic liquid corrosion inhibitors containing derivatives of benzothiazolyl-thio succinic acid. The common structural moiety for these inhibitors is shown in scheme 2 below.

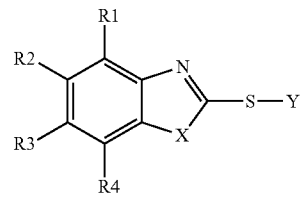

In various embodiments, the common structural moiety, X, is oxygen, sulfur, or a secondary or tertiary amine group, and R1, R2, R3, and R4 are each independently hydrogen, alkyl, halogenoalkyl, alkoxy, alkyl thio, alkyl sulfonyl, cyclo alkyl phenyl, alkyl phenyl, phenyl alkyl, halogen, —CN, —NO$_2$, —COOH, —COOalkyl, —OH, a primary, secondary or tertiary amino, or carbamoyl group. Additionally, functional groups labeled as "Y" in scheme 2 constitute the rest of the corrosion inhibitor's chemical structure, and in various embodiments may include an aliphatic or cycloaliphatic mono-, di-, tri- or tetracarboxylic acid. In various embodiments, the corrosion inhibitor may be tethered to an oligomer or polymer or solid support through any part of the functional groups labeled R, X, or Y in the structural moiety depicted in scheme 2. In other embodiments, the corrosion inhibitor may be tethered to the microcapsule shell wall via R1, R2, R3, R4, Y, or X if X is a tertiary amine.

In the polymerized form, the corrosion inhibitor may remain incorporated within the polymerized healing agent, facilitating adhesion to the substrates. Additionally, in various embodiments, a primary mode of corrosion inhibition compatible with the protective material delivery mechanism and liquid protective materials is anodic passivation via adsorption to the metal surface or covalent linkages elements in the metal substrate. In various embodiments, corrosion inhibitors may be added to a liquid healing agent formulation at concentrations ranging from 0.1 wt % to 10 wt %, and a combination of both classes of inhibitors may be used to leverage slightly different properties.

In various embodiments, the disclosed resin and curing agent raw materials for use as part of an epoxy-based self-healing system may have certain properties. For instance, in some embodiments, the resin and curing agent may be sufficiently hydrophobic to facilitate their encapsulation via more common and more easily scalable oil-in-water encapsulation processes. Furthermore, in various embodiments, the hydrophobicity exhibited by both resin and curing agent components may allow for reactivity under water, a feature that is essential for coated, joined or sealed structures installed below the water line.

Additionally, in various embodiments, upon cross-linking, the resulting polymer may have improved UV stability relative to standard epoxies cured by amines and amides, which are notorious for their rapid degradation due to UV radiation. In some embodiments, this feature may be important for ensuring that the polymerized epoxy material formed in the damage site after a self-healing event is sufficiently resistant to UV degradation so as to remain intact long enough to afford significant life extension to the matrix epoxy coating, adhesive, or sealant.

Furthermore, in various embodiments, the resulting cross-linked polymer may exhibit mechanical, adhesive, chemical resistance and corrosion resistance properties similar to epoxies cured using typical amine and amide curing agents. As used herein, the term "typical curing agents" refers to materials such as diethylenetriamine (DETA), triethylenetetramine (TETA), aliphatic polyamines and more generally, organic curing agents that may cross-link typical epoxy resins at ambient temperature.

In various embodiments, using the desired properties for the dual capsule epoxy system discussed above as selection criteria, a range of hydrophobic amines was screened, and it was determined that, in general, aminosiloxanes with higher amine equivalent weights are sufficiently hydrophobic to form stable oil-in-water emulsions, and reactive enough to cross-link epoxy resins at ambient temperature to yield cured resins with mechanical properties similar to those cured with more common amine curing agents such as DETA or TETA. Specific, non-limiting examples of classes of aminosiloxanes that meet these criteria include those with the generalized structures shown in FIGS. 2A-2C.

Figure 2B:
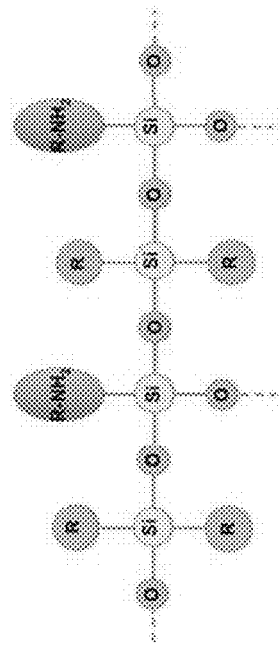
FIGS. 2A-2C illustrate generalized structures of three examples of aminosiloxanes, in accordance with various embodiments.
Figure 2C:
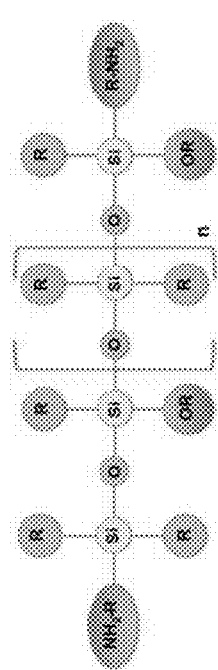
Figure 2A:
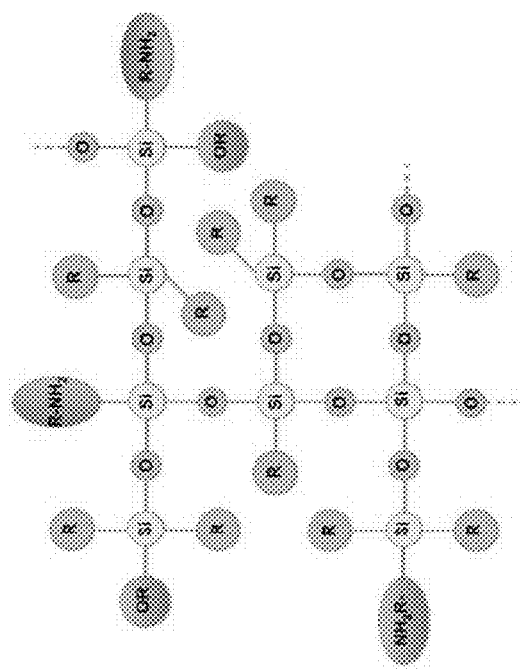

FIGS. 2A-2C illustrate generalized structures of three examples of aminosiloxanes, in accordance with various embodiments. In the illustrated example, one aminosiloxane from the class labeled Aminosiloxane 1 is shown in FIG. 2A. For the specific aminosiloxane selected, the "R" group has the structure —$(CH_2)_3NH(CH_2)_2NH_2$. Unless otherwise stated, this specific aminosiloxane is referred to herein as Aminosiloxane 1. Aminosiloxanes 2 and 3 are also shown (FIGS. 2B and 2C).

Figure 3A:
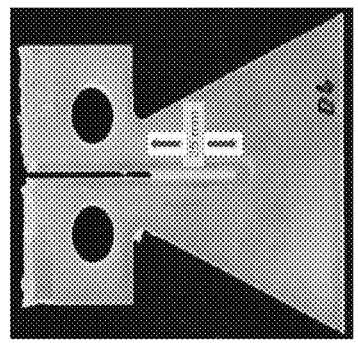
FIGS. 3A-3C illustrate an EPON 828 Tapered Double Cantiliver Beam (TDCB) Specimen (FIG. 3A), a graph showing a comparison of representative load-displacement curves for the fracture of an EPON 828/DETA resin system and the resin system healed with a formulation that included EPON 828, xylenes, and Aminosiloxane 1, which was injected into the fracture plane (FIG. 3B), and a graph showing a comparison of representative load-displacement curves for the fracture of a self-healing EPON 828-DETA resin, with a healing efficiency of about 45% (FIG. 3C), in accordance with various embodiments.
Figure 3B:
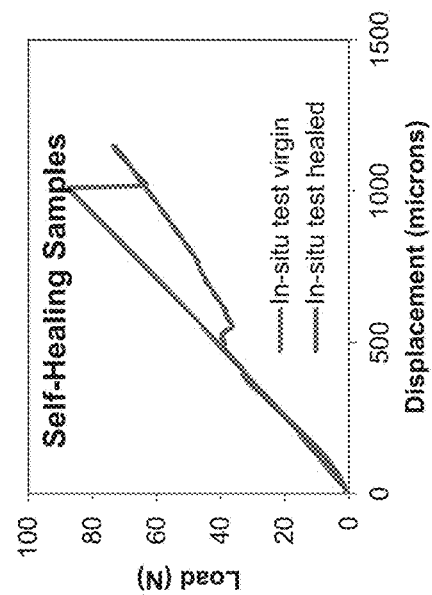
Figure 3C:
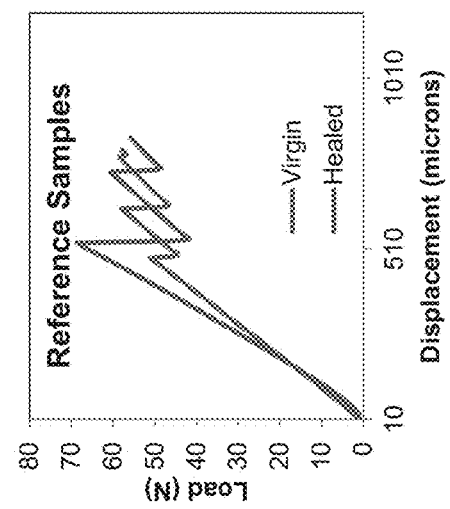

To illustrate the ability of Aminosiloxane 1 to crosslink an epoxy resin at ambient temperature, the adhesive strength of a formulation comprised of microcapsules containing EPON 828 (60 wt %) and xylenes (40 wt %) and either DETA or Aminosiloxane 1 in a ratio of 1:1.5 were tested using a pull off adhesion tester and found to be similar (Table 1). FIGS. 3A-3C illustrate an EPON 828 Tapered Double Cantilever Beam (TDCB) Specimen (FIG. 3A), a graph showing a comparison of representative load-displacement curves for the fracture of an EPON 828/DETA resin system and the resin system healed with a formulation that included EPON 828, xylenes, and Aminosiloxane 1, which was injected into the fracture plane (FIG. 3B), and a graph showing a comparison of representative load-displacement curves for the fracture of a self-healing EPON 828-DETA resin, with a healing efficiency of about 45% (FIG. 3C), in accordance with various embodiments. These results were obtained by curing at ambient temperature, while self-healing chemistries based on the encapsulation of secondary amines exhibited poor cross-linking kinetics at ambient temperature.

TABLE 1

Assessment of Adhesive Strength of Aminosiloxane-Cured Epoxy Resin

| Adhesive Formulation | Microencapsulated Resin-Based Formulation | Added Amine Curing Agent | Adhesion Strength (MPa) |
|---|---|---|---|
| Comparative Example | 60 wt % EPON 828, 40 wt % xylenes | DETA | 0.220 |
| Formulation Example 1 | 60 wt % EPON 828, 40 wt % xylenes | Aminosiloxane 1 | 0.245 |

Figure 4:
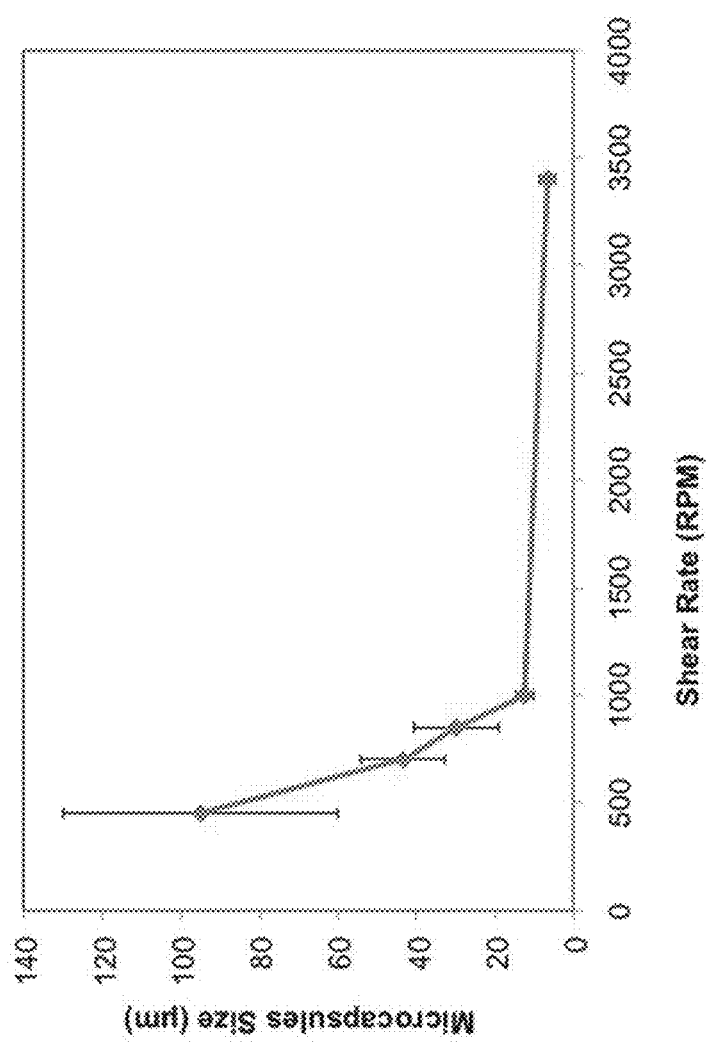
FIG. 4 is a graph showing size control of poly(oxymethylenemelamine) capsules containing Aminosiloxane 1, in accordance with various embodiments.
Figure 5B:
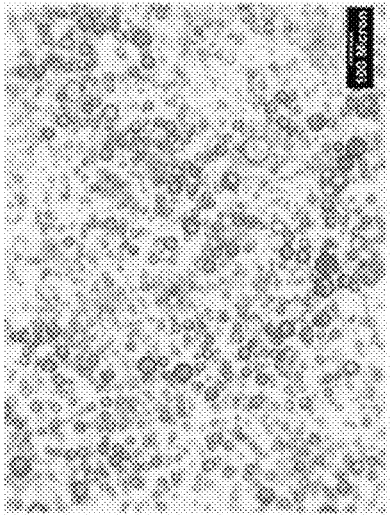
FIGS. 5A-5D are a series of digital images showing optical microscopy images of capsules of various sizes containing Aminosiloxane 1, including an average size range of 10-15 µm (FIG. 5A), an average size range of 20-30 µm (FIG. 5B), an average size range of 40-50 µm (FIG. 5C), and an average size range of 80-100 µm (FIG. 5D), in accordance with various embodiments.
Figure 5D:
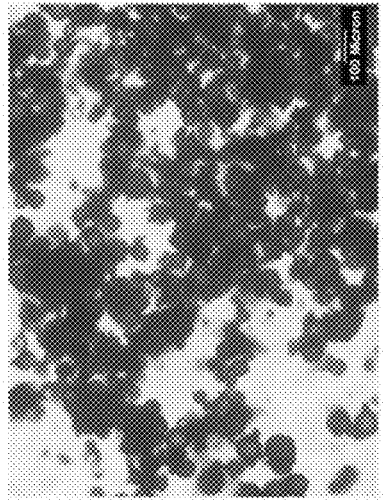
Figure 5A:
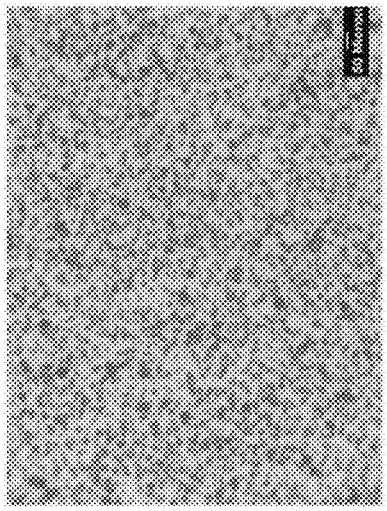
Figure 5C:
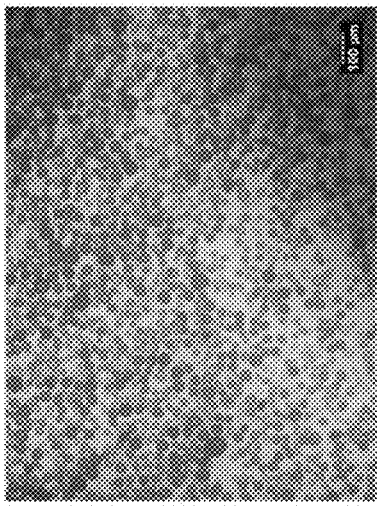

FIG. 4 is a graph showing size control of poly(oxymethylenemelamine) or melamine-formaldehyde capsules containing Aminosiloxane 1, and FIGS. 5A-5D provide a series of digital images showing optical microscopy images of capsules of various sizes containing Aminosiloxane 1, including an average size range of 10-15 μm (FIG. 5A), an average size range of 20-30 μm (FIG. 5B), an average size range of 40-50 μm (FIG. 5C), and an average size range of 80-100 μm (FIG. 5D), in accordance with various embodiments. To demonstrate the performance of a dual-capsule epoxy self-healing system, a prototype system was prepared by selecting a commercially available aminosiloxane (Aminosiloxane 1) with an amine equivalent weight of 247 g/equivalent compared to 21 g/equivalent and 24 g/equivalent for DETA and TETA, respectively. Using xylenes as a diluent to lower the viscosity of the aminosiloxane raw material, microcapsules were produced that exhibited average sizes that were shear rate dependent (see FIG. 4 for size dependence chart and FIGS. 5A-5D for corresponding images of capsules of varying sizes).

The resulting capsules were then tested, as part of a dual capsule system, in a range of tests including healing efficiency characterization of polymerized epoxy resins via fracture of TDCB specimen, and salt fog exposure of substrates coated with liquid coating, powder coating and adhesive formulations incorporating the dual capsule epoxy self-healing system.

Figure 6:
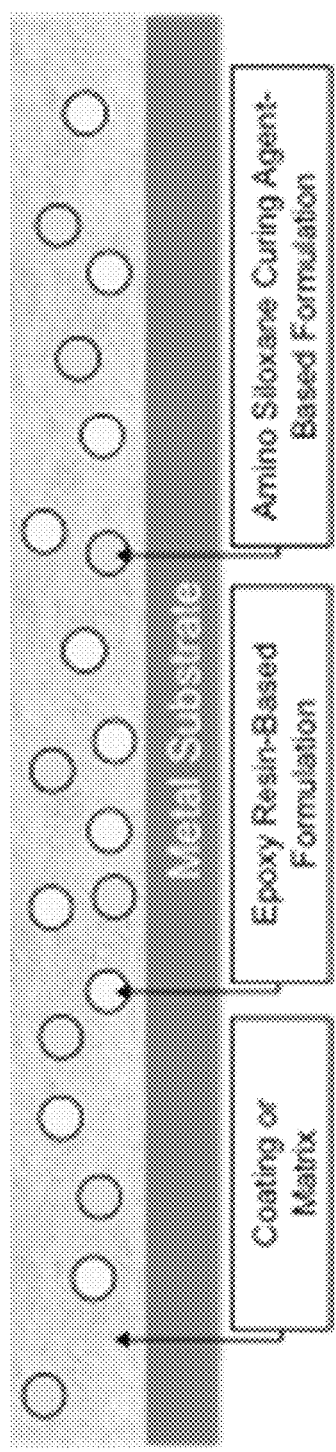
FIG. 6 shows a schematic illustration of a dual capsule epoxy-based self-healing system having resin and curing agent components incorporated into separate formulations and encapsulated in separate capsules, with the capsules then being incorporated into the matrix in a specified ratio (typically 1:1, but other ratios have been evaluated). Damage to the matrix will rupture both capsule types releasing their contents into the site of damage where they will react to form an epoxy film that restores structural continuity in the case of polymerized resins and protective function in the case of coating, in accordance with various embodiments.

FIG. 6 shows a schematic illustration of a dual capsule epoxy-based self-healing system having resin and curing agent components incorporated into separate formulations and encapsulated in separate capsules, with the capsules then being incorporated into the matrix in a specified ratio (typically 1:1, but other ratios have been evaluated). Damage to the matrix will rupture both capsule types, releasing their contents into the site of damage, where they will react to form an epoxy film that restores structural continuity in the case of polymerized resins and protective function in the case of coating, in accordance with various embodiments. A healing efficiency of about 45% was measured for an EPON 828/DETA polymerized resin containing 10 wt % of capsules containing 60 wt % EPON 828 and 40 wt % xylenes and 10 wt % of capsules containing 60 wt % of Aminosiloxane 1 and 40 wt % of xylenes (FIG. 3C).

The self-healing performance of protective coating and adhesive formulations was determined by comparing formulations that were drawn down on cold-rolled steel (CRS). The data from these experiments is summarized in Table 2. In all of these experiments, the newly developed epoxy system exhibited the expected benefits. These results represent the first demonstration of a dual capsule epoxy self-healing system that includes an encapsulated primary amine capable of appreciable self-healing performance at ambient temperature.

TABLE 2

Summary of Self-Healing Performance Results

| Matrix Model | Formulation | Capsule A Description, (Loading) | Capsule B Description, (Loading) | Coating Dry Film Thickness (μm) | Scribe Creep (186 micron scribe, mm) | Scribe Creep (500 micron scribe, mm) |
|---|---|---|---|---|---|---|
| Adhesive Comparative Example | EPON 828: Aminosiloxane 1 (ratio of 1:1 by weight) | N/A | N/A | 300-400 | 3.91 | 8.0 |
| Adhesive Inventive Example | EPON 828: Aminosiloxane 1 (ratio of 1:1 by weight) | Epoxy Resin, Phenyl Ethyl Acetate Corrosion Inhibitor (2.5 wt %)* | Aminosiloxane 1 Ethyl Phenyl Acetate Corrosion Inhibitor (2.5 wt %)* | 300-400 | 1.76 | 2.4 |
| Liquid Coating Comparative Example | Epoxy Resin/Xylenes Solution, Aliphatic Polyamine | N/A | N/A | 150-200 | 6.2 | 14.1 |
| Liquid Coating Inventive Example | Epoxy Resin/Xylenes Solution, Aliphatic Polyamine | Epoxy Resin, Xylenes Corrosion Inhibitor (2.5 wt %)* | Aminosiloxane 1, Xylenes Corrosion Inhibitor (2.5 wt %)* | 150-200 | 2.2 | 2.5 |
| Powder Coating Comparative Example | Epoxy Clear Powder Coating | N/A | N/A | 100-150 | — | 13.8 |
| Powder Coating Inventive Example | Epoxy Clear Powder Coating | Epoxy Resin, Ethyl Phenyl Acetate Corrosion Inhibitor (3.3 wt %)* | Aminosiloxane 1 (1.7 wt %)* | 100-150 | — | 0.3 |

*Loading data (wt %) represents loading or concentration in the matrix (adhesive, liquid or powder coating).

In various embodiments, for efficient healing after damage, the healing agent contained within the microcapsules in microcapsule-based self-healing systems, must quickly migrate out of the microcapsules and into the site of damage. As such, if viscous resins are used in the design of self-healing systems, their viscosities must be reduced to facilitate the flow of the healing agent into the site of damage during a healing event. Thus, in various embodiments, an appropriate solvent should be selected to facilitate reduction of the resin viscosity. Furthermore, in various embodiments, in the design of dual-capsule systems, it may be beneficial to formulate the compositions within both varieties of capsules with the same solvent to facilitate mixing of both compositions in the site of damage during a healing event.

In various embodiments, the solvent selected may also contribute to the self-healing performance observed in cases in which the matrix (coating, adhesive or sealant) is a thermoset. In these embodiments, selecting a solvent capable of swelling the network of the thermoset allows for penetration of the healing agent into the network and upon polymerization, the adhesion between the polymerized healing agent and the matrix, which is of primary importance in load bearing self-healing applications such as adhesives, benefits from entanglement between the networks.

In various embodiments, in designing self-healing systems based on aminosiloxanes, when the matrix is an epoxy resin, formulations incorporating polar solvents exhibit better performance relative to otherwise identical formulations containing non-polar solvents. Table 3 shows a comparison of the performance of an epoxy adhesive incorporating microcapsules containing EPON 828 and either xylenes or ethyl phenyl acetate (EPA) in width tapered double cantilever beam (WTDCB) adhesive fracture experiments. After fracture a curing formulation containing Aminosiloxane 1 and either EPA or xylenes was injected into the fracture plane. The samples healed with the manually injected formulation containing EPA outperformed those containing xylenes. Although polar solvents such as EPA have previously been used to swell epoxy networks in self-healing systems that take advantage of residual curing agent available in the matrix, the results disclosed herein are for fully-cured epoxy adhesives with no residual curing agent available in the matrix. As such, the performance improvement observed for self-healing systems employing the more polar solvent are presumably due to the solvent's ability to penetrate the epoxy networks and facilitate entanglement as described above.

Finally, in various embodiments, the solvent chosen may have an impact on the ability to encapsulate the aminosiloxane. In general, solvents that contribute to increasing the hydrophobicity of the core phase will facilitate the encapsulation process. For encapsulations based on the formation of oil-in-water emulsions therefore, the miscibility of the solvent with water should be as close to zero as possible.

TABLE 3

The Effect of Solvent Choice on Self-Healing Performance

| Test Adhesive Formulation | Base Adhesive Formulation (wt %) | Microencapsulated Resin-Based Formulation | Microcapsule Loading (wt %) | Injected Healing Agent Formulation | Peak Fracture Load (N) |
|---|---|---|---|---|---|
| Control Example | 100 | N/A | 0 | N/A | 0 |
| Formulation Example 2 | 95 | 60 wt % EPON 828, 40 wt % xylenes | 5 | 60 wt % Aminosiloxane 1 40 wt % xylenes | 98 |
| Formulation Example 3 | 95 | 60 wt % EPON 828, 40 wt % xylenes | 5 | 60 wt % Aminosiloxane 1 40 wt % EPA | 130 |

Figure 7B:
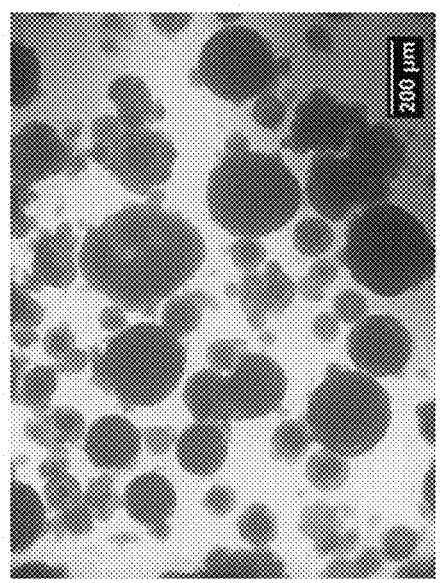
FIGS. 7A and 7B are digital images of Aminosiloxane microparticles with PMMA shell walls, including dried PMMA/Aminosiloxane 1 capsules dispersed in water (FIG. 7A), and dried PMMA/Aminosiloxane 1 capsules dispersed in hexyl acetate (FIG. 7B), in accordance with various embodiments.
Figure 7A:
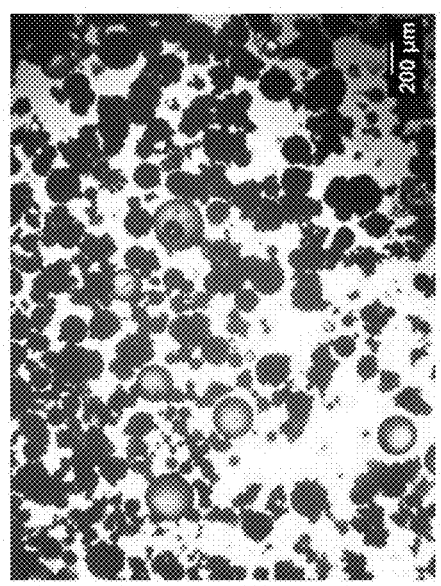

In various embodiments, upon successful preparation of a formulation containing an aminosiloxane that may be emulsified using an oil-in-water emulsion, encapsulation procedures that can tolerate and/or account for the basicity afforded by the amines may be used to complete the encapsulation process. In various embodiments, these may include shell walls such as melamine-formaldehyde, urea-formaldehyde, polyurethane, polyurea and polyacrylate. One specific, non-limiting example of a procedure for this approach is provided below. Another viable approach is the use of thermoplastic polymers such as poly(methylmethacrylate) (PMMA) to form a shell wall for the aminosiloxane formulation via solvent evaporation. Microcapsules obtained using this approach are shown in FIGS. 7A and 7B, which are digital images of Aminosiloxane microparticles with PMMA shell walls, including dried PMMA/Aminosiloxane 1 capsules dispersed in water (FIG. 7A), and dried PMMA/Aminosiloxane 1 capsules dispersed in hexyl acetate (FIG. 7B), in accordance with various embodiments.

EXAMPLES

Example 1

Adhesion Properties of Epoxy Formulation Cured with Aminosiloxane Curing Agent

Microcapsules containing a blend of EPON 828 (60 wt %) and xylenes (40 wt %) were prepared as described by Brown et al. The capsules were then blended with either DETA or Aminosiloxane 1 at ratio of 1:1.5 (capsules: curing agent). This ratio ensured there was sufficient curing agent to fully wet the capsules. The resulting mixture was then applied to the bottom of a dolly used in conjunction with a pull off adhesion tester. The dolly was then adhered to a previously cleaned (light abrasion followed by acetone wipe) Al 2024-T3 substrate by pressing using body weight to promote rupture of the capsules. The samples were allowed to cure at room temperature (RT) for 18 hours. The force required to separate the adhered dolly from the aluminum substrate was recorded using a PosiTest AT-M pull-off tester. The results are summarized in Table 1.

Example 2

Fracture Testing of Polymerized Epoxy Resin

Fracture tests were performed using two types of healing experiments. For the first experiment, referred to as a reference test, TDCB samples were molded from a mixture of 100 parts EPON 828 to 12 parts DETA. The samples were cured for 24 h at RT followed by 24 h at 35° C. After curing, the samples were then pre-cracked and fractured in a load frame by pin-loading to failure at a rate of 5 μm/s. After fracture, a healing agent blend of EPON 828 (60 wt %) and xylenes (40 wt %) and Aminosiloxane 1 (60 wt %) and xylenes (40 wt %) was injected into the fracture planes of the samples. The samples were allowed to cure for 24 h after which they were re-fractured. A representative load-displacement curve for these experiments is shown in FIG. 3B. The second type of fracture test performed was that of a fully self-healing system incorporating microcapsules as shown in FIG. 6. A set of EPON 828/DETA samples were prepared incorporating a total of 20 wt % of microcapsules with one half (10 wt %) comprised by microcapsules containing 60 wt % EPON 828 and 40 wt % xylenes and the second half containing a blend of Aminosiloxane 1 (60 wt %) and xylenes (40 wt %). The EPON 828 (100 parts) and DETA (12 parts) were mixed prior to gradual addition of the microcapsules while mixing with a spatula. The resulting resin blend was then molded into samples and cured for 24 hours at RT, followed by another 24 hours at 35° C. The samples were then fractured as described above and allowed to cure for 24 hours (since this was a fully self-healing sample, no healing agent blend was injected into the fracture plane), after which they were re-fractured. A representative load-displacement curve for these experiments is provided in FIG. 3C.

Example 3

WTDCB Testing

The performance of aminosiloxanes as part of a dual-capsule epoxy self-healing system was evaluated in Width-Tapered Double Cantilever Beam (WTDCB) experiments. Microcapsules containing EPON 828 (60 wt %) and xylenes (40 wt %) were incorporated into an elevated cure epoxy structural adhesive (alkyl diamine/phenolic epoxy resin-based) at 5 wt %. The modified adhesive was then applied between two A36 structural steel adherends machined into the WTDCB specimen geometry. An adhesive bond line of 300 microns was maintained using aluminum shims. The adhesive was then allowed to cure at 177° C. for 1 hour at 0.31 MPa in a platen press. After curing, the samples were fractured by pin-loading to failure at a rate of 0.1 mm/s. After fracture, 150 μL of a blend of Aminosiloxane 1 (60 wt %) and xylenes (40 wt %) or Aminosiloxane 1 (60 wt %) and EPA (40 wt %) was injected into the fracture plane between the two halves of the WTDCB sample, covering the entire plane. Any excess of the injected material was allowed to leak out the sides when the two halves of the WTDCB sample were re-set together prior to allowing the samples to cure for 24 hours at 38° C. After curing, the samples were re-fractured and the peak fracture load of the samples recorded. The data is summarized in Table 3.

Example 4

Microencapsulation of Healing Agent Formulation Incorporating Aminosiloxane 1

Aminosiloxane 1 was encapsulated in the neat form, without any dilution, and as part of a healing agent formulation containing Aminosiloxane 1 (60 wt %) and EPA (40 wt %) or Aminosiloxane 1 (60 wt %) and xylenes (40 wt %) using the procedure detailed below. A melamine-formaldehyde prepolymer solution was first prepared as follows. 40 mL of deionized water was measured into a 200 mL glass container with a lid and 5 g of melamine and 10.6 g of formaldehyde (37% solution in water) were added. The pH of the mixture was then adjusted from 6.2 to 9.0 by adding a 5 wt % solution of NaOH in water dropwise. The reaction mixture was then heated at 75-80° C. for 1.5 hours to form the prepolymer. The prepolymer solution was then cooled to RT.

Separately, 200 mL of deionized water was measured into a 600 mL beaker, followed by the addition of 50 mL of a previously prepared solution of 5 wt % poly(vinyl alcohol) (PVA, 87-89% hydrolyzed). The solution was then stirred using a mechanical stirrer at 500-3400 RPM. If foaming was observed, 5-6 drops of octanol was added as a defoaming agent. The core blend of Aminosiloxane 1 and xylenes (56 g) was then slowly added to the solution to form an emulsion, followed by stirring for 10 minutes.

The prepolymer solution was then slowly added to the emulsion. The reaction mixture was then heated to 40° C. and stirred for 20 minutes at this temperature. The pH of the reaction mixture was then adjusted from 10.5 to 6.5 by adding an acetic acid solution (3 mol/L). The reaction temperature was then increased to 55° C. at a rate of 80° C./min and held at this temperature for 1 hour, at which point the pH was decreased to 4.5 by addition of the acetic acid solution. The reaction was allowed to proceed for an additional 2 hours, followed by cooling of the reaction mixture to RT. The resulting microcapsules were isolated by centrifugation and rinsed by repeated successive steps of re-dispersion in water followed by centrifugation. The capsules were then air dried for 48 hours.

In various embodiments, this procedure may be adapted for the use of alternative shell walls, such as urea-formaldehyde, polyurethane, polyurea and polyacrylate shell walls formed from similar interfacial or in situ emulsion polymerization procedures.

Example 5

Microencapsulation of Healing Agent Formulation Incorporating Aminosiloxane 3

Aminosiloxane 3 was encapsulated in the neat form, without any dilution, and as part of a healing agent formulation containing Aminosiloxane 3 (50 wt %) and EPA (50 wt %) or Aminosiloxane 3 (50 wt %) and xylenes (50 wt %) using the procedure detailed below. A melamine-formaldehyde prepolymer solution was first prepared as described in Example 4, or a commercially available prepolymer Resimene AQ7551 was used.

Separately, 200 mL of deionized water was measured into a 600 mL stainless steel reaction container, followed by the addition of 50-60 mL of a previously prepared solution of 5 wt % PVA or 200 mL of a previously prepared solution of 2 wt % Disponil NRG 401 as the surfactant. The solution was then stirred using a mechanical stirrer at 500-800 RPM. If foaming was observed, 5-6 drops of octanol was added as a defoaming agent. The core blend (50 g) containing Aminosiloxane 3 was then slowly added to the solution to form an emulsion, followed by stirring for 10 minutes.

The prepolymer solution was then slowly added to the emulsion. The reaction mixture was then heated to 40° C. and stirred for 30 minutes at this temperature. The pH of the reaction mixture was then adjusted from a starting point of between 8 and 10 (depending on the surfactant and its concentration) to 6.5 by adding an acetic acid solution (3 mol/L). The reaction temperature was then gradually increased to 55° C. and held at this temperature for 1 hour, at which point the pH was further decreased to 4.5 by adding more of acetic acid solution. The reaction was allowed to proceed for an additional 2 hours, followed by cooling of the reaction mixture to RT. The resulting microcapsules were isolated by centrifugation and rinsed by repeated successive steps of re-dispersion in water followed by centrifugation. The capsules were then air dried for 48 hours.

In various embodiments, this procedure may be adapted for the use of alternative shell walls, such as urea-formaldehyde, polyurethane, polyurea and polyacrylate shell walls formed from similar interfacial or in situ emulsion polymerization procedures.

Example 6

Microencapsulation of Healing Agent Formulation Incorporating Aminosiloxane 3 Via Acrylate/Melamine-Formaldehyde Dual Shell Wall Construction Aminosiloxane 3 was encapsulated in the neat form, without any dilution, and as part of a healing agent formulation containing Aminosiloxane 3 (50 wt %) and EPA (50 wt %) or Aminosiloxane 3 (50 wt %) and xylenes (50 wt %) using the procedure detailed below.

75 mL of deionized water was measured into a 600 mL stainless steel reaction vessel, followed by the addition of 125 mL of a previously prepared solution of 5 wt % PVA. The solution was then stirred using a mechanical stirrer at 500 RPM and heated to 65° C. If foaming was observed, 5-6 drops of octanol was added as a defoaming agent. The core blend of Aminosiloxane 3 and xylenes (21.2 g) was then slowly added to the solution to form an emulsion.

Separately, 1.066 g 2,2'-azobis(isobutyronitrile) (AIBN) was added to 21.2 g 2-hydroxyethyl methacrylate (HEMA). The AIBN/HEMA mixture was then added, drop-wise, to the reaction vessel containing the emulsified Aminosiloxane 3 formulation. The reaction mixture was then heated to 70° C., allowed to proceed for additional 3 hours after which it was allowed to cool to room temperature.

To further improve the shell integrity, a melamine-formaldehyde shell wall was built on the previously formed acrylate shell via employment of pendant hydroxyl groups present in the poly(HEMA) shell wall in the melamine-formaldehyde shell wall formation reaction as described below. First, 4.34 g a commercially available melamine-formaldehyde prepolymer solution (Resimene 7551) was added to the slurry containing the microcapsules incorporating a poly(HEMA) shell wall. The pH was then adjusted from 7.7 to 6.5 by adding an acetic acid solution (3 mol/L). The reaction temperature was then gradually increased to 65° C. and held at this temperature for 1 hour. The pH was decreased to 4.5 by adding more of the same acetic acid solution. The reaction was then allowed to proceed for an additional 2 hours, followed by cooling of the reaction to RT. The resulting microcapsules were isolated by centrifugation and rinsed by repeated successive steps of re-dispersion in water followed by centrifugation. The microcapsules were then re-dispersed in water for a final time to form a slurry. To facilitate isolation of the resulting capsules from the slurry, 15 wt % of fumed silica (Aerosil 200) was added to the slurry as described below. The capsule solids were first determined via moisture analysis using a moisture balance. Aerosil 200 (6.9 g, 15 wt % of the total capsule solids) was added to 210 g of slurry containing 46.28 g capsules and the mixture was stirred at 600 RPM for 1 hour at room temperature. The resulting silica treated microcapsules were then isolated from the slurry via spray-drying.

In various embodiments, this procedure may be adapted for the use of alternative shell walls, such as urea-formaldehyde, polyurethane, polyurea and polyacrylate shell walls formed from similar interfacial or in situ emulsion polymerization procedures.

Example 7

Microencapsulation Via Solvent Evaporation

In various embodiments, thermoplastic polymers with specific molecular weights, glass transition temperatures (T$_g$) and melting points may be used to form a shell wall or matrix around the aminosiloxane to form a microcapsule or microparticle. To illustrate this approach, poly(methylmethacrylate) (PMMA) was selected as the thermoplastic polymer for forming the shell wall. The PMMA selected had a molecular weight of 100,000 g/mol, a T$_g$ of 105° C. and a melting point of 132° C. An oil phase was prepared by dissolving the PMMA (30 g) in chloroform (120 g) by mixing at 45° C. for 4 hours. Aminosiloxane 1 (30 g) was then stirred into this mixture. To prepare the water phase, deionized water (900 mL) was added to a 3 L beaker, followed by a solution of 5 wt % PVA (87-89% hydrolyzed) in water (100 mL), while stirring using a mechanical stirrer at 500 RPM. The temperature of this solution was then increased to 45° C., while increasing the stirring rate to 1750 RPM.

The oil phase was then quickly added to the water phase, while continuing to stir at the same rate (1750 RPM) for 5 minutes. The reaction temperature was then increased from 45° C. to 60° C., and was allowed continue stirring at this temperature for 3 hours to ensure complete evaporation of the chloroform. The resulting microparticles were isolated from the reaction mixture by suction filtration, rinsed on the filter a total of 3 times using deionized water, and air dried.

Example 8

Preparation and Testing of Model Adhesive

Figure 8:
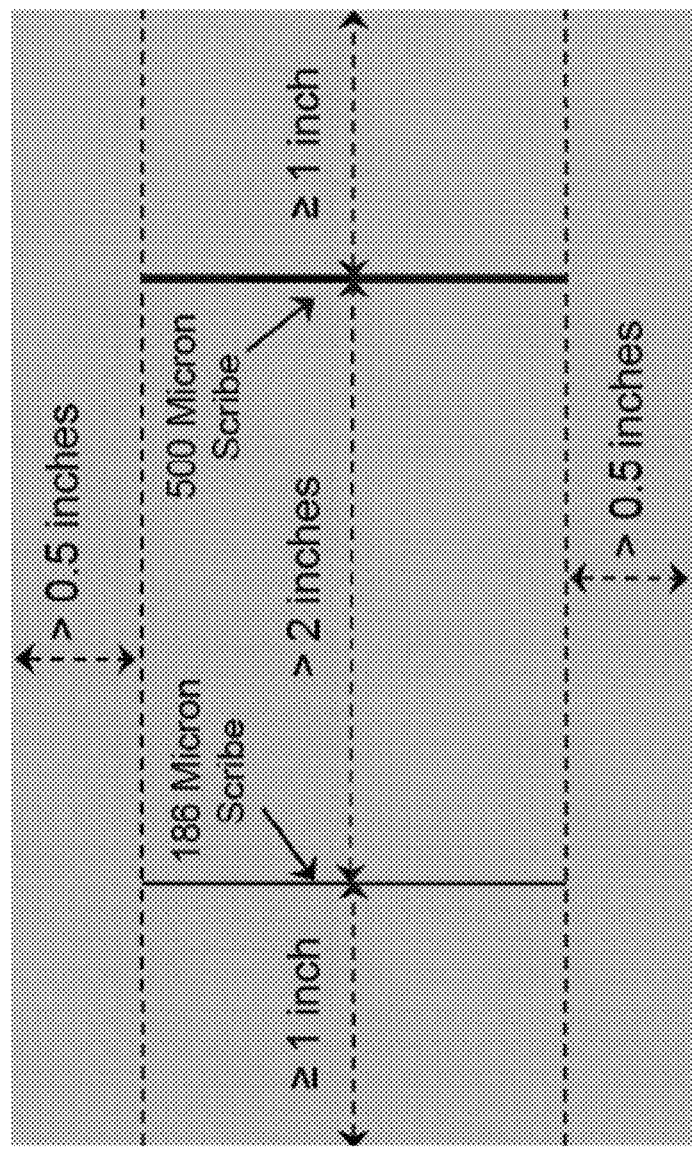
FIG. 8 illustrates a configuration of scribe damage on CRS panels (3 inches wide and 5 inches long), in accordance with various embodiments.

A model RT cure epoxy adhesive was prepared to evaluate the ability of the adhesive to maintain its adhesion after damage via scribing when it has been applied to a metal surface. Creep from scribe, measured in mm, was used as a metric for evaluating adhesion caused by corrosion or disbondment at the adhesive-substrate interface. The adhesive was prepared by mixing EPON 828 and Aminosiloxane 1 in a 1:1 ratio, followed by addition of a specified concentration of capsule type A and capsule type B as shown in Table 2. The adhesive formulation was then mixed thoroughly using a spatula and degassed under vacuum for 15 minutes to remove entrapped air bubbles. The resulting adhesive was then applied by drawdown to CRS panels (3 in by 5 in) previously prepared by light abrasion and wiping with acetone. The panels were allowed to cure for 24 hours, after which a second layer of adhesive without any capsules was applied to prepare a two-coat system in which the capsules added were localized in the layer closest to the substrate. The samples were allowed to cure for an additional 48 hours, after which each panel was scribed as shown in FIG. 8, which illustrates a configuration of scribe damage on CRS panels (3 inches wide and 5 inches long), in accordance with various embodiments The samples were then allowed to heal for 24 hours, after which they were inserted into a salt fog chamber (ASTM B117 conditions) for 640 hours. Scribe creep measured after the exposure is summarized in Table 2.

Example 9

Preparation and Testing of Liquid Coating Formulation

A liquid coating formulation was prepared by combining the base component of an epoxy clear coating (DER 671-X75, Dow Chemical) and the curing agent (DEH 58, Dow Chemical) in a 1:1 ratio followed by addition of 2.5 wt % each of capsule A and capsule B, which are described in Table 2. The formulation was then mixed with a spatula, followed by mixing via mechanical stirring. The resulting coating formulation was then applied by drawdown on CRS panels that were previously lightly abraded and wiped with acetone. The panels were allowed to cure for a minimum of 24 hours at room temperature. After curing, the panels were scribed using 186 micron and 500 micron scribe tools as shown in FIG. 8. The coated samples were then allowed to heal for 24 hours at RT, after which the samples were inserted into a salt fog (ASTM B117 conditions) for 5 days. Scribe creep measured after the exposure is summarized in Table 2.

Example 10

Preparation and Testing of Powder Coating Formulation

A total of 5 wt % of microcapsules (3.3 wt % Capsule A and 1.7 wt % Capsule B, Table 2) was tumble blended with a clear epoxy powder coating formulation for a total of about 2-3 minutes. The resulting powder was then applied on iron phosphate (Bonderite 1000) pretreated panels by electrostatic spray and cured at 200° C. for 10 minutes. After at least 1 day at RT, the samples were scribed as shown in FIG. 8 (note: only the 500 micron scribe was applied on these samples), allowed to heal at RT for 24 hours, followed by exposure to a salt fog (ASTM B117 conditions) for 500 hours. Scribe creep measured after the exposure is summarized in Table 2. Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. A protective material formulation comprising a first microcapsule encapsulating an aminosiloxane, a hydrophobic diluent, and a liquid hydrophobic corrosion inhibitor, wherein the aminosiloxane comprises a primary amine functional group.

2. The protective material of claim 1, wherein the aminosiloxane is capable of reacting with an uncured epoxy resin to form a cross-linked epoxy resin at ambient temperature.

3. The protective material formulation of claim 1, further comprising a second microcapsule encapsulating an epoxy resin capable of being cross-linked at ambient conditions by the primary amine functional group.

4. The protective material formulation of claim 3, wherein the second microcapsule further comprises a hydrophobic diluent and a corrosion inhibitor.

5. The protective material of claim 4, wherein the protective material formulation is a component in a coating material, sealant, or adhesive formulation.

6. The protective material of claim 5, wherein the coating material, sealant, or adhesive is applied to a metal substrate.

7. The protective material formulation of claim 3, wherein the protective material formulation is a component in a coating material, sealant, or adhesive formulation.

8. The protective material formulation of claim 7, wherein the coating material, sealant, or adhesive is applied to a metal substrate.

9. A corrosion inhibiting or resistant coating, sealant or adhesive formulation comprising the protective material formulation of claim 1.

10. The corrosion inhibiting or resistant coating, sealant, or adhesive of claim 9, wherein the coating, sealant, or adhesive is applied to a metal substrate.

11. A self-curing resin system comprising the protective material formulation of claim 1.

12. The self-curing resin system of claim 11, wherein the capsules are dispersed within an uncured epoxy resin, liquid or powder coating, adhesive or sealant formulation.

13. The self-curing resin system of claim 12, wherein the self-curing resin system is a "one-part" formulation, wherein a curing event is initiated upon rupture of the first microcapsule.

14. The self-curing resin system of claim 13, wherein rupture occurs via heat or application of mechanical force to the first microcapsule.

15. A method of using a coating material, sealant, or adhesive, comprising:
providing a coating material, sealant, or adhesive comprising a first microcapsule encapsulating an aminosiloxane, a hydrophobic diluent, and a liquid hydrophobic corrosion inhibitor, wherein the aminosiloxane comprises a primary amine functional group; and
applying the coating material, sealant, or adhesive to a substrate.

16. The method of claim 15, wherein the aminosiloxane is capable of reacting with an uncured epoxy resin to form a cross-linked epoxy resin at ambient temperature.

17. The method of claim 15, wherein the coating material, sealant, or adhesive further comprises a second microcapsule encapsulating an epoxy resin capable of being cross-linked at ambient conditions by the primary amine functional group.

18. The method of claim 17, wherein the second microcapsule further comprises a hydrophobic diluent and a corrosion inhibitor.

19. A method of increasing a protective property of a coating material, sealant, or adhesive, comprising adding a first microcapsule encapsulating an aminosiloxane, a hydrophobic diluent, and a liquid hydrophobic corrosion inhibitor, to the coating material, sealant, or adhesive, wherein the aminosiloxane comprises a primary amine functional group.

20. The method of claim 19, wherein the aminosiloxane is capable of reacting with an uncured epoxy resin to form a cross-linked epoxy resin at ambient temperature.

21. The method of claim 19, wherein the method further comprises adding a second microcapsule to the coating material, sealant, or adhesive, wherein the second microcapsule encapsulates an epoxy resin capable of being cross-linked at ambient conditions by the primary amine functional group.

22. The method of claim 21, wherein the second microcapsule further comprises a hydrophobic diluent and a corrosion inhibitor.

* * * * *